Patented Mar. 2, 1948

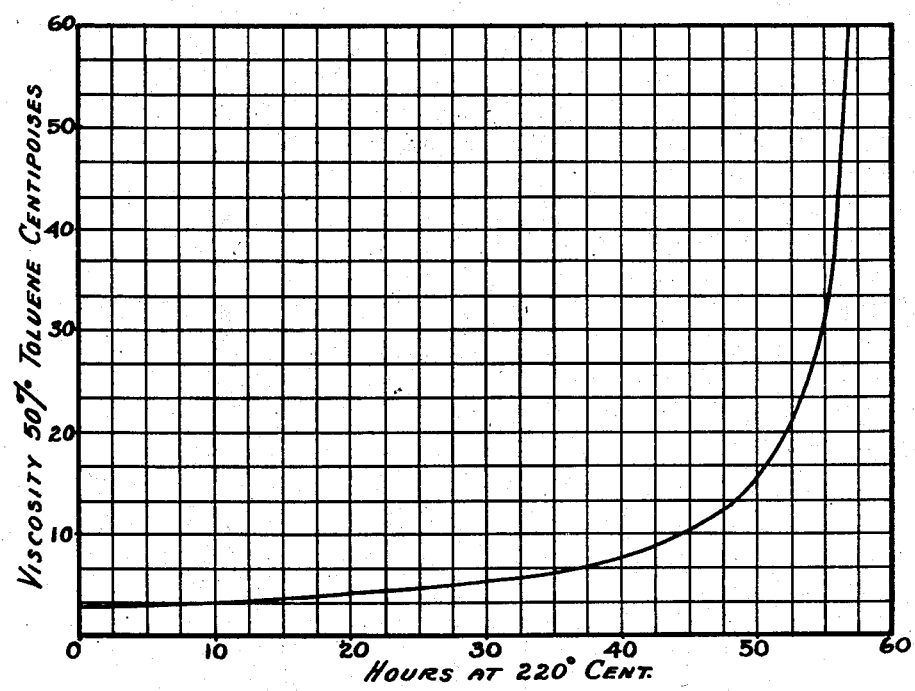

2,437,204

UNITED STATES PATENT OFFICE 2,437,204

SULFURIC ACID POLYMERIZATION OF DIORGANOSILOXANES

Rob Roy McGregor, Verona, and Earl Leathen Warrick, Pittsburgh, Pa., assignors to Corning Glass Works, Corning, N. Y., a corporation of New York Application March 30, 1943, Serial No. 481,143

6 Claims. (Cl. 260—607)

This invention relates to new compositions of matter, their preparation and uses and, more particularly, to organo-silicon polymers and methods of preparing them.

This application is a continuation-in-part of our copending application Serial Number 460,830, filed October 5, 1942.

The present invention is concerned with a method of further polymerizing organo-silicon oxide polymers and with the products derived therefrom. Organo-silicon oxide polymers are compounds which contain organic radicals attached to silicon through a carbon atom and whose silicon atoms are joined to other silicon atoms by oxygen atoms, thus Si—O—Si. They may be prepared by the hydrolysis of hydrolyzable organo-silicanes and condensation of the hydrolysis products. Furthermore, hydrolysis of a mixture of different hydrolyzable organo-silicanes and co-condensation of the hydrolysis products produces organo-silicon oxide copolymers which are within the scope of our invention. In the latter case, a hydrolyzable silicane which contains no organic radicals attached to silicon through a carbon atom, such as silicon tetrachloride or ethyl orthosilicate, may be included along with the hydrolyzable organo-silicanes. By hydrolyzable organo-silicanes we mean derivatives of $SiH_4$ which contain readily hydrolyzable radicals such as hydrogen, halogens, amino groups, alkoxy, aroxy and acyloxy radicals, etc., the remaining valences of the silicon atoms being satisfied by organic radicals that are joined to the silicon atoms through carbon atoms such as alkyl, substituted alkyl, aryl, substituted aryl radicals, etc.

Hydrolysis of the above silicanes or mixtures thereof is generally concurrently accompanied by condensation to a greater or less degree depending upon the conditions of hydrolysis and the particular silicanes involved. As a result of the hydrolysis and concurrent condensation, organo-silicon oxide polymers or organo-siloxanes (as they are now commonly called) are produced which are partially or completely condensed and which have on the average up to and including three organic radicals attached to each silicon atom. The polymers so obtained vary in character, some being oily liquids, others being crystalline solids or gels. They also vary in the ease with which they may be further polymerized by heat since they differ in the number of active functional groups retained as a result of incomplete hyrolysis and condensation. Those which are only partially condensed may be converted to higher polymers and even to solids by heat alone or even by standing at room temperature by virtue of the completion of condensation. On the other hand, those organo-siloxanes which approach complete condensation are extremely resistant to further polymerization by heat alone. These substantially completely condensed polymers are not limited to those which are of high molecular weight but may be polymers of low molecular weight as well. For example, the condensed hydrolysis products of the di-organo-silicanes are essentially completely condensed even in the low polymeric stages and exist generally as liquids in the trimeric form with polymers as high as the hexamer being reported in only rare instances. Since the higher polymers of these organo-silicon oxide compounds, and particularly the higher polymers of the substantially completely condensed compounds, have been found to possess properties which adapt them to many industrial applications as will be described below, it is highly desirable to provide a method of further polymerizing the organo-silicon oxide polymers to higher polymeric compositions, that is, to increase their average molecular weight.

The primary object of this invention is to provide a method of polymerizing the hydrolysis products of hydrolyzable organo-silicanes or mixtures thereof.

Another object of our invention is to provide a method of further polymerizing an organo-siloxane having on the average less than three organic radicals attached through carbon atoms to each silicon atom.

Another object of our invention is to provide a method of further polymerizing a substantially completely condensed liquid hydrolysis product of a silicane of the type $R_2SiX_2$, where each R is an organic radical which is joined to the silicon atom through a carbon atom and each X is a hydrolyzable atom or group.

Still another object of the present invention is to provide a method of polymerizing a substantially completely condensed liquid hydrolysis product of a mixture comprising essentially a di-organo-substituted silicane to a polymeric composition which is substantially free of polymers having less than seven silicon atoms per molecule.

Another object of our invention is to provide a method of polymerizing to a heat convertible state a liquid organo-siloxane having on the average less than three organic radicals attached through carbon atoms to each silicon atom.

A further object of our invention is to provide a method of polymerizing to an infusible resinous solid a liquid organo-siloxane having on the average less than three organic radicals attached through carbon atoms to each silicon atom.

Another object of our invention is to prepare organo-siloxanes of high average molecular weight which are heat convertible and soluble in organic solvents.

A still further object of our invention is to prepare organo-siloxanes of high average molecular weight which are tack-free resins.

In accordance with our invention, we have provided a method of preparing an extremely useful polymeric composition from the hydrolysis product of a hydrolyzable organo-silicane or of a mixture of hydrolyzable silicanes which comprises treating the hydrolysis product with sulphuric acid under polymerizing conditions until a polymeric composition having the properties desired is obtained. If desired, the sulphuric acid may be added during the initial hydrolysis and condensation of the silicane or mixture of silicanes since we have found sulphuric acid to be an effective condensation agent as well as catalyst for promoting the rearrangement of Si—O—Si bonds. It is important, especially in the case of the liquid hydrolysis products which are substantially free of active functional groups, that the sulphuric acid be maintained in intimate and continuous contact with the organo-siloxane until a polymeric mixture of the desired average molecular weight is obtained, for we have found that an appreciable increase in average molecular weight does not occur until the polymer has been so treated for some time. After this induction period, the viscosity and average molecular weight of the treated material rises rapidly until a stage of polymerization is reached where the sulphuric acid is no longer necessary to promote polymerization but heat in the presence of air is sufficient to convert the polymer to a tack-free resinous solid. Those organo-siloxanes which are initially only partially condensed, of course, do polymerize by heat alone but we have found that treatment of these siloxanes in accordance with our invention not only increases the rate of polymerization but in many instances produces flexible resinous solids instead of the mechanically weak gels ordinarily obtained by heat alone. In carrying out our method, we have found that the addition of water in the form of steam during the polymerization process aids in speeding up the polymerization. The particular concentration and quantity of acid employed and the optimum temperature for carrying out the polymerization are conditions which vary with the organo-siloxane being treated and also with the type of product desired as will be readily apparent from the examples given below. However, we prefer to use aqueous acid or at least to have water present to some extent if concentrated acid is used since too rigorous treatment with sulphuric acid will result in excessive oxidation of the silicone. We also prefer to carry out the polymerization with sulphuric acid at a temperature between about 100° C. and about 250° C. although lower temperatures have been employed with success. Upon completion of the process the sulphuric acid may be removed but we have found that in certain instances its continued presence does no harm and in fact may improve the properties of the product for certain purposes.

In general, any liquid organo-siloxane having on the average less than three organic radicals attached through carbon atoms to each silicon atom may be polymerized by our method; that is, treatment in accordance with our method will result in an increase in average molecular weight. Our method is not generally applicable to those polymers having three organic radicals attached to each silicon atom, that is, the dimeric ethers, since the only way the latter can polymerize is by removal of groups. However, it is to be understood that groups may be removed to some extent by the sulphuric acid treatment but it is believed that polymerization of the condensed organo-siloxanes is primarily due to a rearrangement of the Si—O—Si bonds under the influence of the acid.

We have found that sulphuric acid is greatly superior to other catalysts not only in speeding up the polymerization of the organo-siloxanes but in producing products with more desirable properties. By the use of sulphuric acid, liquid polymers may be obtained which reach extremely high viscosities without gelation and tack-free resinous solids of excellent mechanical properties may be obtained. We have further found that by using sulphuric acid as a polymerization catalyst a greater yield of polymerized product is obtained than with other acid catalysts. This is probably due to the rapidity of the polymerization whereby the lower molecular weight polymers which are more volatile are quickly converted to the more viscous and accordingly less volatile higher molecular weight polymers. Another advantage in employing sulphuric acid arises from its relatively low volatility thereby insuring continuous and intimate contact with the treated organo-siloxane.

For better understanding of our invention, reference should be had to the accompanying drawing in which the effect of sulphuric acid on phenyl ethyl silicone is shown and to the following examples.

EXAMPLE 1

Dimethyldiethoxysilicane was mixed with 34% by volume of 85% sulphuric acid. After being stirred for five minutes, its viscosity was 720 Saybolt seconds at 30° C. Another sample of the dimethyldiethoxy silane was hydrolyzed in the presence of concentrated hydrochloric acid and then refluxed; its viscosity was only 49.2 Saybolt seconds at 30° C. after 4 hours of such treatment.

EXAMPLE 2

A mixture of 100 cc. of dimethyldiethoxysilicane, 50 cc. of 85% sulphuric acid and 2 cc. of 30% hydrogen peroxide (for maintaining solution clear) was stirred for five minutes. A viscous oil was produced. This was heated under a vacuum (150 mm.) and stirred by means of a stream of air. The temperature was kept at 115°–120° C. for 6 hours and at 120°–200° C. for 4½ hours. The resulting polymer which was very viscous was dissolved in benzene. A tape consisting of woven glass fibers was dipped into the benzene solution and upon withdrawal was baked for 20 hours at 130° C., for 48 hours at 250° C., and for 100 hours at 300° C. The resulting coated tape was non-tacky and flexible.

EXAMPLE 3

A mixture of 300 cc. of dimethyldiethoxysilicane, 150 cc. of 95% ethyl alcohol and 150 cc. of concentrated hydrochloric acid was refluxed for four hours. An oil was separated from the mixture having a viscosity of 34 Saybolt seconds. To a sample of this oil 4 drops of concentrated sulphuric acid (about 2% by weight) were added. Air was then bubbled through the oil at 30°

C. for 2 hours. Its viscosity was determined to be 720 seconds. It was further heated on a water bath for two hours with air bubbling through. Lower boiling fractions which were distilled off the product amounted to about 2% by weight. The residue had a viscosity of 4300 Saybolt seconds.

EXAMPLE 4

A mixture of 10 cc. of butyltriethoxysilicane, 10 cc. of 95% ethyl alcohol and 1.4 cc. of 1.0 N sulphuric acid was held at 30° C. for 21 hours. 3 cc. of carbitol acetate were then added to the mixture in order to facilitate the removal of alcohol and water in subsequent desiccation. The entire mixture was transferred to an aluminum dish in a desiccator where it was maintained under vacuum for 24 hours. The alcohol and water were thereby removed. The aluminum dish and its contents were then placed in an oven at 100° C. for 3 days; at 175° C. for two days and at 200° C. for a day. The product was a horny resin while a blank which had been subjected to the same treatment without any sulphuric acid was completely shattered and had lost 3½ times as much weight as the sulphuric acid treated sample.

EXAMPLE 5

A mixture of 726 cc. of methyltriethoxysilicane and 429 cc. of dimethyldiethoxysilicane was poured into 570 cc. of 2 N hydrochloric acid which had been cooled to 0°–5° C. The reaction mixture was kept at 0°–5° C. for 3 hours. A viscous liquid precipitated which was separated and allowed to stand at 0° C. for 24 hours. A sample of this liquid was heated at 285° C. until it solidified to a resin which was very brittle and cracked. Another sample of the viscous liquid was dissolved in toluene to which 5 drops of concentrated sulphuric acid were added. The solution was refluxed for 45 minutes. The solvent was distilled off and the residue heated to 280° C. A non-brittle non-tacky resin was obtained.

EXAMPLE 6

Dibutyldiethoxysilicane was hydrolyzed in alcohol in the presence of hydrochloric acid to a liquid which had a viscosity of 224 Saybolt seconds at 30° C. Two samples of the liquid were heated at 100° C. while a stream of air was bubbled through for stirring. One sample contained 0.4% by weight of concentrated sulphuric acid while the other served as a blank. The viscosities of these samples after different periods of heating are given in the table.

Table

| Time of Heating | Viscosity Saybolt Sulphuric Sample | Seconds Blank |
|---|---|---|
| 0 | 224 | 224 |
| 4 hours | 250 | 237 |
| 7 hours | 276 | 256 |
| 13 hours | 328 | 276 |

EXAMPLE 7

Phenyl ethyl silicon dichloride was hydrolyzed to an oil which was established to consist primarily of the trimer of phenyl ethyl silicone. A charge containing 346 lbs. of this trimer was heated to a temperature of 190° C. over a period of 10 hours. Five hundred grams of a 50% aqueous sulphuric acid solution was added over a period of two hours. Steam was then introduced very slowly into the mixture. After eight hours at 190°–200° C., the temperature was raised to 220° C. and held there for the remainder of the polymerization which required a total of 48 hours at 220° C. An additional 400 g. of 50% acid was added in three shots at the end of 27, 33, and 50 hours after the first addition to replace the acid distilled out. During the passage of the steam the viscosity of the mixture increased and was tested at intervals by withdrawing samples of the mixture, dissolving each sample in an equal weight of toluene, and measuring the viscosity of the resultant solution. When the viscosity in the toluene solution reached 65 centipoises, the charge was cooled to 100° C. and 220 lbs. of toluene added and stirred until the viscous polymeric mixture was completely dissolved. The solution was then filtered with "filter cell" through a filter press and concentrated to 314 lbs. of a 70% solid content. This toluene solution serves as an excellent coating composition for impregnating the interstices of glass fibre insulating tape, the toluene being evaporated by heat leaving a film which set to a tough adherent coating when heated in the neighborhood of 250° C. The figure in the drawing is a graph which shows the change in viscosity of the heated mixture with time. The first eight hours at 200° C. are omitted. It will be observed that during the greater part of the time of heating the increase in viscosity is extremely slow but that when the viscosity does start to rise it increases very rapidly so that most of the increase is effected in a very short time.

EXAMPLE 8

A mixture of ethyl silicon trichloride, phenyl ethyl silicon dichloride and diphenyl ethyl silicon monochloride in the molar ratio of 1–3–2 respectively was dissolved in ether and hydrolyzed by mixing with water. The ether solution of the resulting copolymer was washed free of hydrochloric acid, and the ether removed by distillation. The resulting ether free copolymer was then polymerized with .2% by weight of $H_2SO_4$ while blowing with steam. After 30 hours, the product was a resinous tacky material, soluble in toluene and having a viscosity in 50% solution of 420 centistokes at 25° C. Applied from a toluene solution to glass fibre tape it dried (after removal of solvent) in 3 hours of baking at 250° C. to a heat resistant, tack-free resin.

EXAMPLE 9

A mixture of ethyl silicon trichloride, phenyl silicon trichloride, phenyl ethyl silicon dichloride, diphenyl silicon dichloride, diethyl silicon dichloride and diphenyl ethyl silicon monochloride (prepared by reaction of silicon tetrachloride, phenyl magnesium chloride and ethyl magnesium chloride in molar ratio of 1–1–1 at −20° C.) was dissolved in ether and hydrolyzed with water. The ether solution was washed free of acid and the ether removed by distillation. The resulting copolymer material was polymerized to a viscous, tacky material by heating at 220° C. with .2% by weight of $H_2SO_4$ while blowing with steam. The material was soluble in toluene and when applied from a toluene solution to glass fibre tape it dried (after removal of solvent) within a few hours of baking at 250° C. to a heat resistant tack-free resin.

Other examples of organo-silicon compounds which may be polymerized to high molecular weight compositions by treatment with sulphuric acid are the condensed hydrolysis products of ethyl silicon trichloride, amyl silicon trichloride, diethyl silicon dichloride, diamyl silicon dichloride, diphenyl silicon dichloride, phenylmethyldiethoxysilicane, etc. Besides these hydrolysis products, copolymers containing on the average of up to but not including three organic radicals per silicon atom may be polymerized in accordance with this invention. These copolymers may be prepared by the cohydrolysis and co-condensation of mixtures of differently substituted hydrolyzable silicanes obtained as products of the reaction of an organo-magnesium halide with silicon tetrachloride or ethyl orthosilicate or by mixing different silicanes to give mixtures of desired constituents in predetermined quantities. Among the silicanes employed to accomplish the latter were silicon tetrachloride, ethylorthosilicate, methyltriethoxysilicane, dimethyldiethoxysilicane, trimethylethoxysilicane, phenylmethyldiethoxysilicane, phenyldimethylethoxysilicane, phenyltriethoxysilicane, diphenyldiethoxysilicane, ethyltriethoxysilicane, diethyl silicon dichloride, phenyl ethyl silicon dichloride, butyltriethoxysilicane, dibutyldiethoxysilicane, benzyltriethoxysilicane, dibenzyldiethoxysilicane and others.

Our invention is applicable to any organo-silicon oxide polymer having on the average less than three organic radicals attached to each silicon atom through carbon atoms. The unusual properties of these polymers are due primarily to the Si—O—Si groups present therein and to the organic radicals attached to the silicon atoms. The kind and number of organic radicals attached to silicon do not affect the fundamental behavior of the polymers, but only modify certain particular properties thereof. Besides the organic radicals already disclosed such radicals may be present as propyl, isopropyl, amyl, hexyl, heptyl to octadecyl and higher; alicyclic radicals such as cyclopentyl, cyclohexyl, etc.; aryl and alkaryl radicals such as mono- and poly-alkyl phenyls as tolyl, xylyl, mesityl, mono-, di-, and tri-ethyl phenyls, mono-, di-, and tri-propyl phenyls, etc.; naphthyl, mono- and poly-alkyl naphthyls as methyl naphthyl, diethyl naphthyls, tri-propyl naphthyl, etc.; tetra-hydro-naphthyl, anthracyl, etc.; aralkyl such as benzyl, phenylethyl, etc.; alkenyl such as methallyl, allyl, etc.

The new polymers may be used for various purposes. For example, they are excellent coatings for metallic conductors and excellent impregnating agents, particularly in the fabrication of electrical insulating materials, because in their intermediate form they can be dissolved and applied in the form of solutions for the impregnation of various fibrous materials and thereafter can be polymerized to complete insolubility and infusibility. In the latter state they have good mechanical characteristics and good electrical properties at room temperature, all of which are retained at temperatures above those at which prior coating materials break down and deteriorate. The new polymers are relatively non-flammable and are likewise superior to prior coatings in that under extreme conditions of temperature, etc. there is little tendency to carbonize.

In making use of the new polymers for impregnating tapes and other fibrous materials for electrical insulation the polymerization is carried out until the material has attained the sticky, viscous heat-convertible state just short of insolubility. Then, if desired, the acid may be removed by neutralization with alkali such as sodium hydroxide or calcium hydroxide. The alkali, when added in excess, also serves to remove impurities that may be present such as iron, etc. The neutralized product is dissolved in toluene or other suitable solvent. The solution is applied by dipping, brushing or spraying, followed by evaporation of the solvent. Several applications of the solution may be required to produce a coating of sufficient thickness. When the solvent has completely evaporated, the coated article is baked for several hours at a temperature preferably between 200° C. and 300° C. until the viscous polymeric mixture is converted to a tack-free coating. With the phenyl ethyl silicone polymer, this condition is attained by baking for about 36 hours while the temperature is slowly raised from about 200° C. to about 260° C. Other organo-silicon polymers within the scope of our invention may require different temperatures and times, but such conditions are readily determined by trial.

In addition to the use of the new polymers in the field of electrical insulation, there are many others for which these polymers at various stages of polymerization are eminently adapted particularly in those stages prior to heat convertibility. In these thermally stable stages, they may be used as hydraulic fluids, liquid insulating media, thermal expansion fluids, waterproofing agents, etc. Their resistance to high temperature, their electrical insulating properties, low freezing points and low vapor pressure adapt them to many diversified industrial applications.

We claim:

1. The method of polymerizing a dehydrated liquid consisting of the dehydrated liquid polymeric diorganosiloxane in which each of the silicon atoms of said siloxane has two and only two organic radicals attached to each silicon atom, one of the two organic radicals attached to each silicon atom being an alkyl radical and the other organic radical being selected from the class consisting of alkyl and aryl radicals, which comprises adding sulphuric acid to said siloxane and maintaining said acid in reactive relationship with said siloxane at a temperature below 250° C. until an increase in viscosity is effected.

2. The method of polymerizing a dehydrated liquid consisting of the dehydrated liquid polymeric diorganosiloxane in which each of the silicon atoms of said siloxane has two and only two organic radicals attached to each silicon atom, one of the two organic radicals attached to each silicon atom being an alkyl radical and the other organic radical being selected from the class consisting of alkyl and aryl radicals, which comprises adding sulphuric acid to said siloxane and maintaining said acid in reactive relationship with said siloxane at a temperature between 100° C. and 250° C. until an increase in viscosity is effected.

3. The method of polymerizing a dehydrated liquid consisting of the dehydrated liquid polymeric dimethyl siloxane in which each of the silicon atoms of said siloxane has two and only two methyl radicals attached thereto, which comprises adding sulphuric acid to said siloxane, and maintaining said acid in reactive relationship with said siloxane at a temperature below 250° C. until an increase in viscosity is effected.

4. The method of polymerizing a dehydrated liquid consisting of the dehydrated liquid polymeric dimethyl siloxane in which each of the silicon atoms of said siloxane has two and only two methyl radicals attached thereto, which comprises adding sulphuric acid to said siloxane, and maintaining said acid in reactive relationship with said siloxane at a temperature between 100° C. and 250° C. until an increase in viscosity is effected.

5. The method of polymerizing a dehydrated liquid consisting of the cyclic trimer of phenyl ethyl siloxane which comprises adding sulphuric acid to said siloxane, and maintaining said acid in reactive relationship with said siloxane at a temperature between 100° C. and 250° C. until an increase in viscosity is effected.

6. The method of polymerizing a dehydrated liquid consisting of the dehydrated liquid polymeric dibutyl siloxane in which each of the silicon atoms of said siloxane has two and only two butyl radicals attached thereto, which comprises adding sulphuric acid to said siloxane and maintaining said acid in reactive relationship with said siloxane at a temperature below 250° C. until an increase in viscosity is effected.

ROB ROY McGREGOR.
EARL LEATHEN WARRICK.

REFERENCES CITED

The following references are of record in the file of this patent:

UNITED STATES PATENTS

| Number | Name | Date |
| --- | --- | --- |
| 2,258,220 | Rochow | Oct. 7, 1941 |
| 2,371,068 | Rochow | Mar. 6, 1945 |

FOREIGN PATENTS

| Number | Country | Date |
| --- | --- | --- |
| 113,708 | Australia | Sept. 4, 1941 |

OTHER REFERENCES

Koton J., Applied Chem. USSR, vol. 12, pp. 1435–9 (1939), as abstracted in Chemical Abstracts, pp. 6242–3, vol. 34, 1940.

Kipping, Proceed. Royal Society Lond., vol. 159, 1937, pp. 139 and 142.

Robison, Tr. J. Chem. Soc. (London), vol. 105, 1914, pages 40 to 47.

Cusa, Proc. J. Chem. Soc. (London), 1932, pages 2205 to 2209.